(12) United States Patent
Kumar et al.

(10) Patent No.: US 9,251,185 B2
(45) Date of Patent: Feb. 2, 2016

(54) CLASSIFYING RESULTS OF SEARCH QUERIES

(76) Inventors: Girish Kumar, Kirkland, WA (US); Sanaz Ahari, Bellevue, WA (US); Farid Hosseini, Redmond, WA (US); Nazan Khan, Bellevue, WA (US); Ahmad Abdulkader, San Jose, CA (US); Ankur Gupta, Redmond, WA (US); Giridhar Kumaran, Issaquah, WA (US); Vijay Nair, Redmond, WA (US)

( * ) Notice: Subject to any disclaimer, the term of this patent is extended or adjusted under 35 U.S.C. 154(b) by 304 days.

(21) Appl. No.: 12/969,140

(22) Filed: Dec. 15, 2010

(65) Prior Publication Data

US 2012/0158702 A1    Jun. 21, 2012

(51) Int. Cl.
G06F 7/00 (2006.01)
G06F 17/30 (2006.01)

(52) U.S. Cl.
CPC .................. G06F 17/30303 (2013.01)

(58) Field of Classification Search
CPC .......... G06F 17/30389; G06F 17/3064; G06F 17/3097; G06F 17/30646; G06F 17/30976
USPC .......... 707/609, 687, 705, 758–780, 790, 899
See application file for complete search history.

(56) References Cited

U.S. PATENT DOCUMENTS

| 7,676,460 | B2 | 3/2010 | Morgan |
| 7,747,598 | B2 * | 6/2010 | Buron et al. ................. 707/705 |
| 7,752,237 | B2 | 7/2010 | Ray |
| 7,752,243 | B2 | 7/2010 | Hoeber |
| 7,792,821 | B2 | 9/2010 | Shakib |
| 7,801,899 | B1 | 9/2010 | Spitkovsky |
| 7,814,085 | B1 | 10/2010 | Pfleger et al. |

(Continued)

FOREIGN PATENT DOCUMENTS

| CN | 101169797 A | 4/2008 |
| CN | 101681352 A | 4/2008 |

(Continued)

OTHER PUBLICATIONS

Jan Pedersen, Snippet Search: a Single Phrase Approach to Text Access, 1991, Proceedings of teh 1991 joint statistical meetings, pp. 1-15.*

(Continued)

*Primary Examiner* — Taelor Kim
(74) *Attorney, Agent, or Firm* — Jessica Meyers; Doug Barker; Micky Minhas (57) ABSTRACT

Computer-readable media, computer systems, and computing methods are provided for classifying search results as either of good quality or of poor quality. Initially, a portion of the search results, such as the highest ranked documents, are selected for evaluation. A level of quality for each of the selected search results is determined using a classification process that includes the following steps: targeting features demonstrated by the selected search results to be evaluated; evaluating the selected features to generate a level-of-quality score for each of the selected search results; comparing the score against a predefined threshold value; and, based on the comparison, assigning each of the selected search results an absolute measurement. The absolute measurement indicates poor quality when the score is less than the threshold value. Upon recognizing that the selected search results are of poor quality, automatically executing a corrective action that reformulates the issued search query.

20 Claims, 6 Drawing Sheets

(56) References Cited

U.S. PATENT DOCUMENTS

| | | | |
|---|---|---|---|
| 7,979,454 B2 | 7/2011 | Tsunokawa | |
| 2002/0052894 A1 | 5/2002 | Bourdoncle et al. | |
| 2002/0078045 A1* | 6/2002 | Dutta | 707/7 |
| 2003/0195877 A1 | 10/2003 | Ford et al. | |
| 2003/0229624 A1* | 12/2003 | Petrisor et al. | 707/3 |
| 2005/0114324 A1* | 5/2005 | Mayer | 707/3 |
| 2006/0010126 A1 | 1/2006 | Anick et al. | |
| 2006/0167842 A1 | 7/2006 | Watson | |
| 2006/0184566 A1 | 8/2006 | Lo et al. | |
| 2006/0190436 A1 | 8/2006 | Richardson | |
| 2006/0224554 A1 | 10/2006 | Bailey | |
| 2006/0235824 A1 | 10/2006 | Cheung | |
| 2006/0288000 A1 | 12/2006 | Gupta | |
| 2007/0162424 A1* | 7/2007 | Jeh et al. | 707/2 |
| 2007/0198495 A1* | 8/2007 | Buron et al. | 707/3 |
| 2007/0282811 A1 | 12/2007 | Musgrove | |
| 2007/0282826 A1 | 12/2007 | Hoeber et al. | |
| 2008/0091670 A1 | 4/2008 | Ismalon | |
| 2008/0104004 A1 | 5/2008 | Brave | |
| 2008/0249786 A1* | 10/2008 | Oldham et al. | 705/1 |
| 2008/0319962 A1 | 12/2008 | Riezler | |
| 2009/0112819 A1 | 4/2009 | Williams et al. | |
| 2009/0144262 A1 | 6/2009 | White | |
| 2009/0187515 A1 | 7/2009 | Andrew et al. | |
| 2009/0281994 A1 | 11/2009 | Byron | |
| 2010/0082634 A1 | 4/2010 | Leban | |
| 2010/0146012 A1 | 6/2010 | Beaudreau | |
| 2010/0185644 A1 | 7/2010 | Gutt et al. | |
| 2010/0306249 A1* | 12/2010 | Hill et al. | 707/769 |
| 2011/0093488 A1 | 4/2011 | Amacker et al. | |
| 2011/0145234 A1 | 6/2011 | Hu | |
| 2012/0078941 A1 | 3/2012 | Tidwell et al. | |

FOREIGN PATENT DOCUMENTS

| | | |
|---|---|---|
| CN | 101339564 A | 1/2009 |
| WO | 2010022655 A1 | 3/2010 |

OTHER PUBLICATIONS

Non-Final Office Action in U.S. Appl. No. 12/969,218 mailed May 31, 2012, 23 pages.
Roulland, et al. "Query Reformulation and Refinement Using NLP-Based Sentence Clustering," 2007, 12 pages, Xerox Research Centre, Grenoble. France, http://citeseerx.ist.psu.edu/viewdoc/download-?doi=10.1.1.70.2594&rep=rep1&type=pdf.
Hoeber, et al., "Visualization Support for Interactive Query Refinement," Sep. 22, 2005, 9 pages, University of Regina, Regina, Saskatchewan, Canada, http://orland.hoeber.net/download/2005_wi.pdf.
Final Office Action in U.S. Appl. No. 12/969,218, mailed Jan. 14, 2013, 26 pages.
"Third Office Action Issued in Chinese Patent Application No. 201110420064.3", Mailed Date: Jan. 16, 2015, 9 pages.
Chinese Office Action dated Jan. 6, 2014 and Search Report dated Dec. 22, 2013 in Chinese Application No. 201110420064.3, 11 pages.
Non-Final Office Action dated Feb. 12, 2014 in U.S. Appl. No. 12/969,218, 31 pages.
Chinese Office Action dated Apr. 8, 2014 in Chinese Application No. 201110420074.7, 11 pages.
Final Office Action dated Jul. 18, 2014 in U.S. Appl. No. 12/969,218, 30 pages.
Chinese Office Action dated Aug. 14, 2014 and Search Report dated Aug. 5, 2014 in Chinese Application No. 201110420064.3, 14 pages.
Non-Final Office Action dated Jan. 20, 2015 in U.S. Appl. No. 12/696,218, 35 pages.
Final Office Action dated Jun. 10, 2015 in U.S. Appl. No. 12/969,218, 29 pages.

* cited by examiner

CLASSIFYING RESULTS OF SEARCH QUERIES

CROSS-REFERENCE TO RELATED APPLICATIONS

This Application is related to U.S. application Ser. No. 12/969,218 filed Dec. 15, 2010, entitled "USER INTERFACE FOR INTERACTIVE QUERY REFORMULATION," the teachings of which are hereby incorporated by reference in their entirety.

BACKGROUND

Search engines are generally designed with the intent to simplify users' lives by helping them find relevant search results (e.g., documents) that match their search queries in a fast and effective way. For instance, users of search engines may compose and submit search queries in order conduct an online search for a service, product, particular information, or any other data targeted by the user intent behind the search query. Often, the set of search results generated by the conventional search engines are of poor quality, meaning that at least a portion of the set of search results does not properly satisfy the user's intent behind the search query. Specifically, in one study, researchers discovered that the top-listed results in roughly one in ten sets of search results were irrelevant to the user's intent of the corresponding search query.

There are various reasons for generating poor-quality search results. Some reasons involve a lack of good-quality documents in a web index being interrogated by the search engine or a failure of a core-ranking algorithm to locate the good-quality documents that exist within the web index.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Embodiments of the present invention address various reasons for generating poor-quality search results including the following: poor user composition of search queries in a format that matches poor-quality documents or other documents that do not satisfy the user's intent behind the search query. These defectively composed search queries may either include extremely common terms that can be interpreted in a multitude of different ways (generating off-topic search results), or include rare terms that do not match any return meaningful documents (generating obscure search results).

Yet, search engines return these off-topic or obscure search results to the user regardless of whether they are actually relevant to the user's intent. This gives the user the false impression that, because the search results matched their search query, the returned search results must be relevant. Upon inspection, however, users often find that the search results are not relevant. Further, if the user desires better, good-quality documents (used interchangeably with the phrase "search results" herein), the user is forced to recompose their search query without any assistance. This deficiency of search engine results in an inefficient and confusing user search experience.

Accordingly, because search engines fail to recognize that poor-quality search results are being offered to the user as a result of the user's defectively composed search query, a novel search engine that automatically determines when the returned search results are of poor quality and, when poor-quality search results are determined, takes corrective action to improve the search query (i.e., re-articulating the user's intent in the context of online searching) would provide an enhanced overall user experience.

Embodiments of the present invention address the problematic issue that many users do not possess proficient search-query formulation skills. For instance, users often type over-extensive or under-inclusive search queries and, upon issuing the search queries to a search engine, users receive search results that are irrelevant to the users' true intent. Other embodiments address the problematic issue that some search queries are inherently vague (e.g., using common terms) or difficult to satisfy (e.g., using rare terms) regardless of how they are formulated.

Accordingly, embodiments of the present invention introduce various methods for detecting irrelevant search results and assisting a user in improving search-result relevance. In one instance, the detection of irrelevant search results is performed by a search engine that attempts to build a classification process for automatically determining a level of quality of search results within a search-engine results page (SERP) for a given user-initiated search query at runtime. In an exemplary embodiment, the search engine implements the classification process to ascertain whether the search results are acceptable in an absolute sense (e.g., either good quality or poor quality) based, in part, on the determined level of quality. Further, when these search results are determined to be of poor quality, they are labeled as such so that one or more corrective actions may be carried out, if appropriate.

Because alterations to a user's search query, such as minor tweaks to terms therein, often improve the relevance of the returned search results, one of the corrective actions may involve implicitly rewriting the search query on the user's behalf. In cases where there is high confidence that the alterations will improve the search results, the rewritten search query is prepared and submitted by the search engine automatically in a transparent manner. In cases where there is a low confidence that the alterations will improve the search results, options for altering key terms (e.g., remove or replace) are explicitly presented to the user to solicit his or her feedback for reformulating the search query. In addition to helping the user reformulate his or her search query, another corrective action may include presenting search results identified to be of good quality, while suppressing those of poor quality. Accordingly, the user is spared the time involved in perusing through poor-quality search results.

BRIEF DESCRIPTION OF THE DRAWINGS

Embodiments of the invention are described in detail below with reference to the attached drawing figures, wherein.

DETAILED DESCRIPTION

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

As can be gleaned from the disclosure below, various embodiments of the present invention pertain to determining a level of quality of search results and, potentially, taking a corrective action to improve the determined level of quality utilizing task-based engines (e.g., decision engines, task engines, individual applications or operations, applet systems, operating systems, and task-based mobile systems), or general systems that attempt to match search results to a user intent inherent within an issued search query. For simplicity of discussion, these engines and/or systems will be hereinafter referred to as "search engines."

Embodiments of the invention described herein include computer-readable media having computer-executable instructions embodied thereon. When executed (e.g., using a processor), the computer-executable instructions perform a method for employing a level of quality of a set of search results to invoke one or more corrective actions. In embodiments, the method includes the steps of accessing the set of search results and determining the level of quality of the set of search results individually by applying a plurality of classifying criteria thereto. In instances, applying the classifying criteria includes evaluating ranking features, quality-level features, caption-level features, session-level features, and/or aggregate features that are expressed by the search results individually. Each of these various types of features are discussed more fully below with respect to FIG. 2.

The method may continue by assigning at least one search result of the set of search results a score within an absolute scale, where the score is based upon the determined level of quality. The score may be compared against a threshold value within the absolute scale. As a result, one or more corrective actions may be selected and performed based on an outcome of the comparison.

In a second illustrative embodiment, the present invention introduces a computer system for making an absolute classification of a quality of at least one search result. Typically, the computer system includes computer software components comprising the following: a query-receiving component; a classifying component; an assignment component, and an application component. The query-receiving component is configured, in embodiments, to receive a search query issued by a user. Typically, the query-receiving component (i.e., frontend component) returns a set of search results that are generated (e.g., using a backend component) based upon the search query. The classifying component is generally responsible for implementing a classification process that automatically determines a quality category of one or more search results within the set of search results. As discussed more fully below with respect to FIG. 3, the classification process involves at least the following steps, in no particular order: examining various features exhibited by the search results to determine an overall level of quality; and deriving an absolute measurement from the overall level of quality determined for each of the search results individually. In an exemplary embodiment, the absolute measurement identifies the search results as either of good quality or of poor quality.

In embodiments, the assigning component labels each of the search results as good quality or bad quality based on an outcome of the classification process. At some subsequent point in time, or in real-time upon accessing the search results, the application component may invoke an appropriate corrective action that corresponds with how the search results are labeled. Generally, the appropriate corrective action is selected based on, in part, a level of confidence that an automatically rewritten search query will provide new search results that are more relevant to the user's intent of the issued search query than the present search results.

In a third illustrative embodiment, a computerized method carried out by a search engine (running on a processor) for classifying search results as either of good quality or of poor quality is provided. Initially, the method involves providing a set of search results returned in response to a search query composed and issued by a user. The set of search results may be ranked against each other. In one instance, the ranking is computed as a function of relevance of each search result to the issued search query. The search engine may then select for evaluation one or more search results that are ranked as highly relevant to the issued search query.

A level of quality for each of the selected search results may be determined by employing a classification process. In an exemplary embodiment, the classification process includes one or more of the following steps: targeting features demonstrated by the selected search results to be evaluated; evaluating the targeted features to individually generate a level-of-quality score for each of the selected search results; comparing the score against a predefined threshold value; and, based on the comparison, assigning each of the selected search results an absolute measurement. In instances, the absolute measurement indicates good quality when the score is greater than the threshold value. Otherwise, the absolute measurement indicates the selected search results are of poor quality. Upon recognizing that the selected search results are assigned an absolute measurement that indicates poor quality, automatically executing a corrective action that reformulates the issued search query upon recognizing.

Having described an overview of embodiments of the present invention, an exemplary operating environment in which embodiments of the present invention may be implemented is described below in order to provide a general context for various aspects of the present invention.

Figure 1:
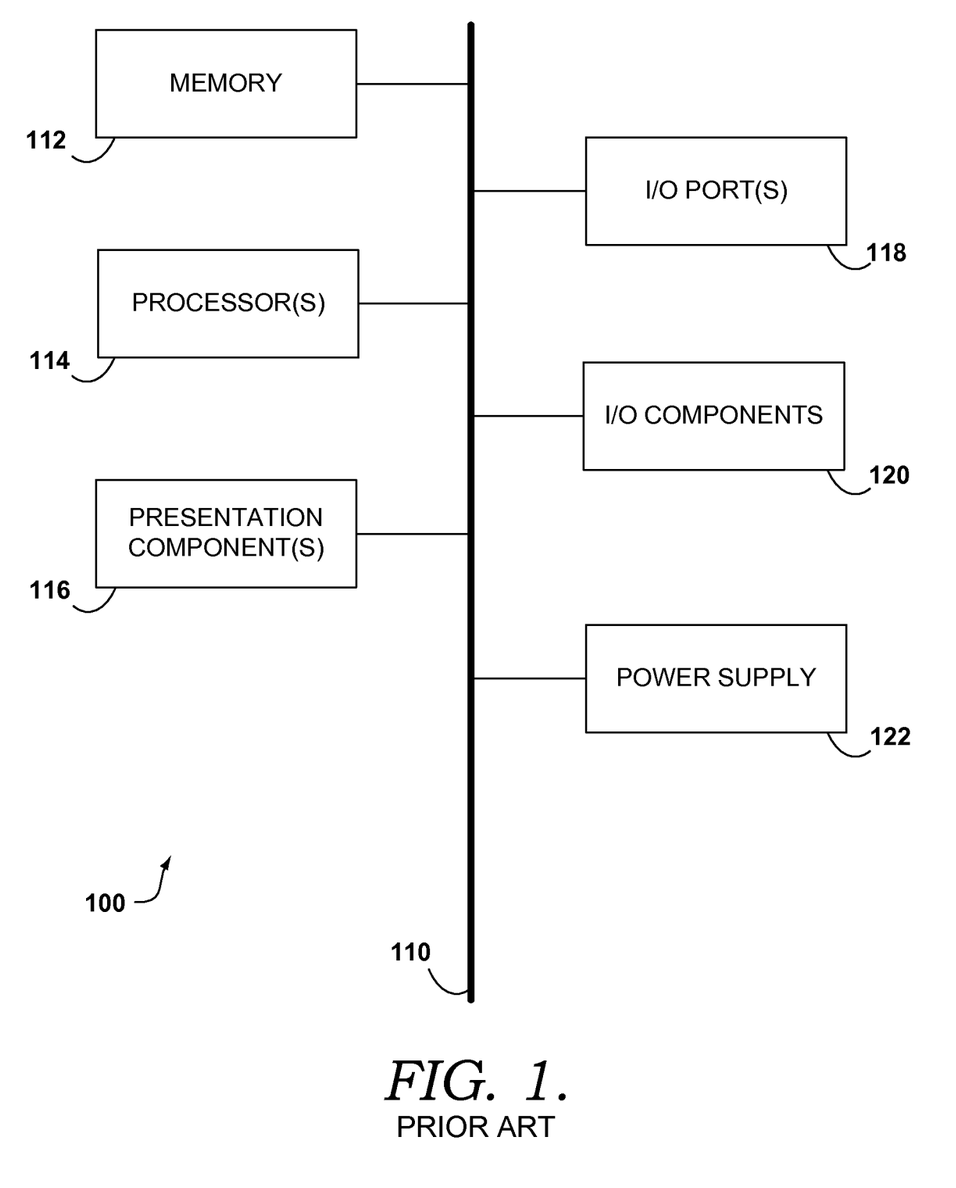
FIG. 1 is a block diagram of an exemplary computing device suitable for implementing embodiments of the invention.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, random-access memory (RAM), read-only memory (ROM), electronically erasable programmable, read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. In embodiments, the computer storage media represents tangible computer readable media, such as medium embodied on a processor.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In embodiments, the communication media represents non-transitory computer readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
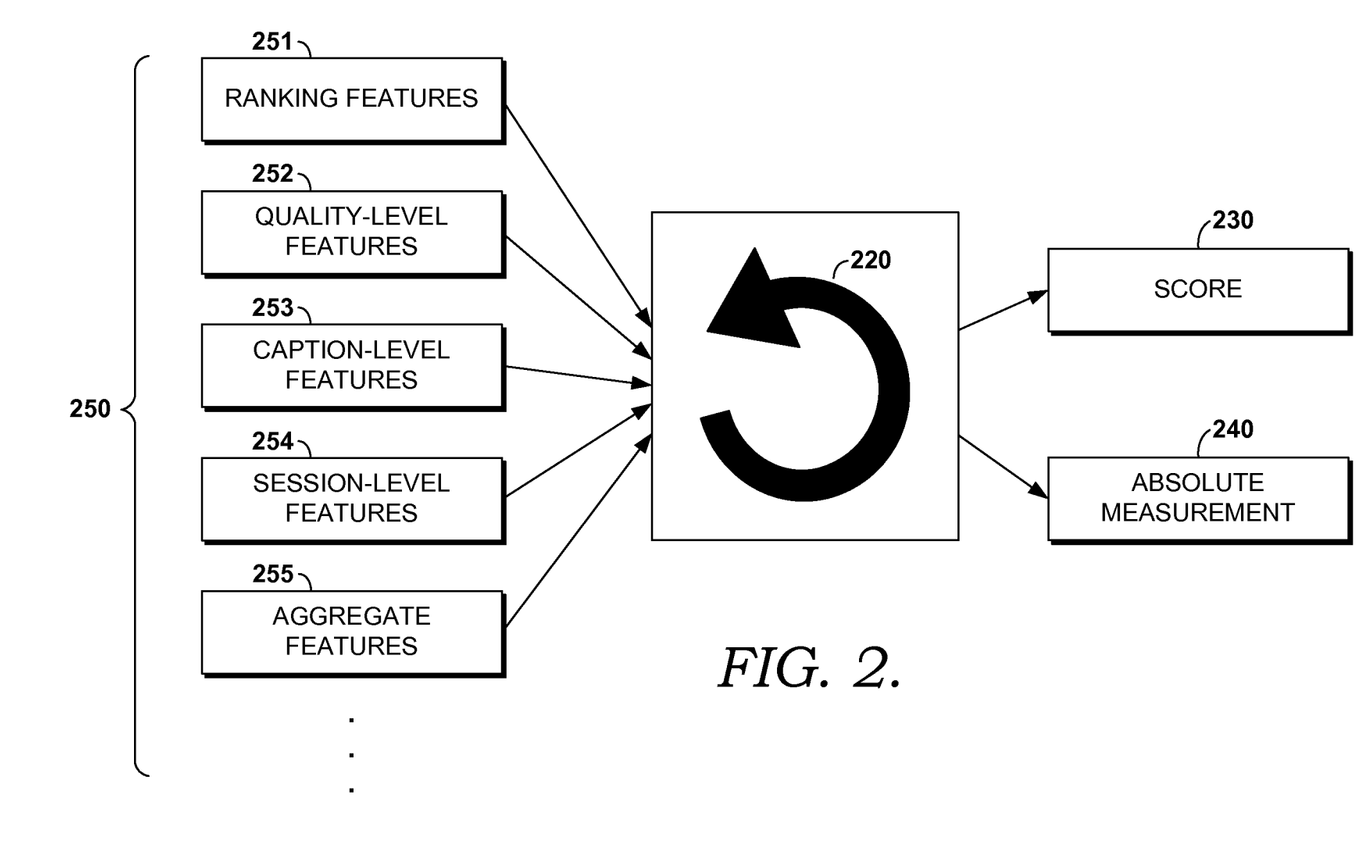
FIG. 2 is a block diagram illustrating various inputs and outputs of an exemplary classification process, in accordance with embodiments of the invention.

Turning now to FIG. 2, a block diagram illustrating various inputs 250 and outputs 230 and 240 of an exemplary classification process 220 is shown, in accordance with embodiments of the invention. Generally, upon accessing a set of search results returned from an issued search query, the search engine determines a level of quality of a portion of the complete set of search results using the classification process 220. Initially, the classification process 220 may involve applying various classifying criteria to one or more search results individually. In instances, the phrase "classifying criteria" broadly pertains to parameters for evaluating any feature demonstrated by the search results that can be examined. As illustrated, some of the features demonstrated by the search results that may be evaluated are ranking features 251, quality-level features 252, caption-level features 253, session-level features 254, and aggregate features 255. In operation, one or more of these features may be targeted for evaluation and the evaluations of these feature(s) are aggregated to generate a level-of-quality score for each of the search results.

Although specific features of the search results being used as the inputs 250 to the classification process 220 have been described, it should be understood and appreciated that other types of suitable inputs and search-result-related features for determining a level of quality may be used, and that embodiments of the present invention are not limited to those five different features 251-255 described herein. That is, other inputs 250 may be employed that actually or potentially contribute to an accuracy of the outputs 230 and 240 of the classification process 220. For instance, user profiles (e.g., including session interactions tracked for a specific user) or query logs (e.g., including social behaviors recorded for a plurality of users), if existing and accessible, may be used as an input 250 to influence the level of quality of the search results.

Initially, the ranking features 251 represent those features that serve to measure a relationship between key terms within the search query and contents of the set of search results (e.g., documents, web page, blogs, and the like). In an exemplary embodiment, the ranking features 251 pertain to query-dependent features of the search results, such as number of matches between the search-query terms and content of the search results. Often, one or more of the ranking features 251 are employed for the task of ranking the search results with respect to one another, in order to develop a search-result order on the search-engine result page (SERP).

In one example, the ranking features 251 may include a number/frequency of matches between terms in the search query and the title of the search result, anchor text pointing to the search result, body of the search result, and/or critical sections (e.g., top of page) of the search result. In embodiments, not all terms of the search query are considered. Typically, the search engine is concerned with whether the search results match, in some way, to the linguistic head (e.g., key terms, rare terms, and the like) of the search query. Accordingly, in embodiments, the linguistic head may be distilled from the search query and employed to evaluate ranking features 251 of the search results, while non-critical, common, natural language of the search query may be ignored for purposes of classification.

In another example, the ranking features 251 pertain to a proximity of matched key terms within the search results. Typically, the closer together the matched terms appear within the search results, the more relevant the search results are with respect to the search query, thus, warranting a high level of quality designation. As discussed throughout, a search result designated as having a high level of quality is usually assigned a high score within the absolute scale, which often translates into an absolute measurement 240 of "good quality."

The quality-level features 252 generally represent features that individually quantify an overall quality of the set of search results independent of the search query. In embodiments, the overall quality is ascertained upon inspecting the contents/title/anchor text of a search result and/or a domain name integral to the search result. In one example, inspecting the contents of the search results involves enumerating a number of misspellings within a body of a document, where a large number of misspellings typically decreases a level of quality associated with the search results. In another example, inspecting the search result's domain involves determining whether the search result navigates to a trusted web site. As can be seen, the quality-level features 252 focus on attributes of the search results independent of terms within the search query.

The caption-level features 253, in one instance, represent features that enumerate a number of matches between key terms within the search query and a search-engine prepared summary (i.e., snippet or instance answer) that is particular to each of set of search results. In another instance, the caption-level features pertain to a determination of whether the snippets are well formed (denoting a high-quality search results), or whether the snippets include incomplete sentences, American Standard Code for Information Interchange (ASCII) junk material, a multitude of numerals/symbols/uniform resource locators (URLs), and/or other non-textual data (denoting a poor-quality search result).

The session-level features 254 generally represent features that label search results within the set of search results as either relevant or irrelevant based upon user-initiated refinements to the search results during a course of an online session. In one instance, the refinements pertain to a number of times the user revised the search query during the online session. Often, more refinements to the search query signify that the user is dissatisfied with the returned search results, which equates to lower levels of quality assigned to the search results presented in response to the search query. In another instance, the refinements pertain to an amount of user-interactions (e.g., selections) directed toward the search results that are generated based on the search query. Often, when little to no user-initiated selections (e.g., mouse click actions) are directed toward the search results, users are uninterested in the search results, thereby indicating that the search results are irrelevant or unpopular in some fashion. Generally, search results found to be unpopular are designated as having a low level of quality.

The aggregate features 255 generally represent features that consider variation between contents of the set of search results, advertisements published at the search-results page, and/or terms comprising related searches offered by the search engine in tandem with the set of search results. As a general rule, in embodiments, high-quality search results are search results that exhibit a sufficient amount of inter-diversity with one another without being overly varied. In one instance, this inter-diversity is articulated as cross-result entropy. As used herein, "cross-result" entropy refers to the randomness, or inconsistencies, expressed by the constituents of the SERP. In one example, where the search results are similar (e.g., sharing one or two domains and/or exposing common subject matter within their content), the cross-result entropy is very low. This low cross-result entropy may occur upon the user entering an over-specified search query, which decreases the search-result level of quality because some inter-diversity is helpful to the user. In another example, where the search results are entirely distinct (e.g., encompassing a wide variety of domains and/or preventing clustering of search results due to lack of common subject matter within their content), the cross-result entropy is very high. This high cross-result entropy may occur upon the user entering an under-specified search query, which also decreases the search-result level of quality because too much inter-diversity is confusing to the user.

Although the content and domains associated with the search results have been described, it should be understood and appreciated that any other suitable attributes of the search results or suitable information on the SERP may be employed to calculate or influence the cross-result entropy, and embodiments of the present invention are not limited to the attributes described above. For instance, entropy between advertisements and/or related-searches data may be considered in adjusting a level of quality of the search results.

In a hypothetical example, the features 215-255 will now be discussed in relation to a search query for "SHOW HOW MUCH BLUE DIAMOND CHIPS ARE WORTH," where the user's intent of the search query is to determine a value of "Blue Diamond" poker chips used for gambling at a particular casino. Initially, the search engine may distill the linguistic head from the search query such that the key terms "blue," "diamond," "chips," and "worth" are used in the classification process 220, while non-critical, common, natural language of the search query (e.g., "show how much") may be ignored for purposes of classification. In one instance, a top-ranked search result may be a document entitled "Wholesale Loose Diamond Chips." This example search result will be utilized within the discussion below to illustrate a functional application of the classification process 220.

Initially, the ranking features 251 of the example search result may be applied to measure a relationship between the key terms within the search query and contents of the example search result. In an exemplary embodiment, there may be a high number of matches between the search-query terms "Diamond," "Chips," and "Worth" while very few matches to "Blue." Specifically, these matches may occur within the title, which includes "Diamond Chips," and may occur frequently within the content of the search results. (This may be why the example search result was a top-ranked search result with respect to the other search results on the SERP.) As a result, the classification process 220 may evaluate the example search result as relevant to the user intent of the search query upon analysis of the ranking features 251. Accordingly, the ranking features 251 may identify the example search result as a "good quality" search result and an outcome of the evaluation of the ranking features 251 might be to incrementally raise the value of the score of the example search result within the absolute scale.

In another example, the quality-level features 252 of the example search result may be applied to individually quantify an overall quality of the example search results independent of the search query. In this hypothetical example, the overall quality of the example search result is ascertained upon inspecting internal characteristics of the example search result. In one instance, the content of the example search result may be inspected to enumerate a number of misspellings within a body of the document. Because the example search result is maintained by a diamond-chip dealer, a large number of misspellings may be detected within the document's body (e.g., a comparatively greater frequency of misspellings with respect to an average web page). As a result, the classification process 220 may evaluate the example search result as of poor quality upon analysis of the quality-level features 252. Accordingly, the quality-level features 252 may identify the example search result as a "poor quality" search result and an outcome of the evaluation of the quality-level features 252 might be to incrementally decrease the value of the score of the example search result within the absolute scale.

In another instance, with respect to the quality-level features 252, the example search result's domain may be inspected to determine whether the example search result navigates to a trusted web site. Again, because the example search result is maintained by a diamond-chip dealer, the address for the web site that hosts the example search result will likely be an non-trusted site, as opposed to the web site of a large, well-known, reputable company. As a result, the classification process 220 may again evaluate the example search result as having poor quality upon analysis of the quality-level features 252. Accordingly, the quality-level features 252 may again identify the example search result as a "poor quality" search result and may again incrementally decrease the value of the score of the example search result within the absolute scale.

In yet another example, the caption-level features 253 of the example search result may be applied to enumerate a number of matches between the key terms within the search query and a search-engine prepared snippet of the example search result that reads "DIAMOND BUYING IS BUYER BEWARE SELLING . . . YOU GET A PICTURE THAT MAY SHOW THE DIAMOND IN ITS BEST COLORS." In this snippet, the key term "Diamond" is matched twice, the key term "Blue" relates to the snipped term "Colors," and the key terms "Chips" and "Worth" are not matched at all. As such, the classification process 220 may evaluate the example search result as having a poor snippet upon analysis of the caption-level features 253.

In still another example, the session-level features 254 of the example search result may be applied to label the example search result as either relevant or irrelevant based upon user-initiated refinements to the search results during a course of an online session. In one instance, if the example search result appeared in a SERP during the same online session and, in response to viewing the example search result, the user refined the search query, the session-level features 254 indicate that the user is dissatisfied with the example search result and the example search result is of poor quality. In another instance, if the example search result appeared in a SERP during the same online session, but received little to no user-initiated selections (e.g., mouse click actions), the session-level features 254 indicate that the user found the example search result irrelevant the user's intent.

In a final example, the aggregate features 255 of the example search result may be applied to consider variation between contents of the search results compared to the example search result. For instance, if all the search results, including the example search result, relate to diamond dealers (exposing common subject matter within their content), the cross-result entropy is very low, which decreases the search-result level of quality because some inter-diversity is helpful to the user.

Upon evaluating various features (e.g., the features 251-255 of FIG. 2) and/or other classifying criteria, the classification process 220 may make a prediction of the search result level of quality. In an exemplary embodiment, the prediction is based on, in part, which rating (good or poor) each of the inputs 250 indicate upon evaluation. When a substantial number of the inputs 250 point in a common direction, the prediction is finalized. For instance, with reference to the hypothetical example above, the evaluation of the inputs 250 resulted in the following: ranking features 251 indicated good quality; quality-level features 252 indicated a poor quality; caption-level features 253 indicated at poor quality; session-level features 254 indicated a poor quality; and aggregate features indicated a poor quality. Because, four of the five classes of analytical features 251-255, upon application to the example search result, indicate the example search result is of a poor quality, the prediction generated by the classification process 220 may classify the example search result as a low level of quality, thereby potentially triggering corrective action.

Upon generating the prediction, in embodiments, the classification process 220 may employ a machine-learning step. That is, the prediction may then be compared against, or mapped to, an outcome of human-judged ratings of a similar set of search results. Upon comparison, the classification process 220 determines an accuracy of the prediction and adapts its evaluation methodology by training against the human-judged ratings. Adapting may involve, learning how to weigh various inputs 250, classes of features, and the features 251-255 when compiling the ratings to determine the predictive search-result level of quality. In other words, the classification process 220 is configured to learn to identify the classifying criteria that is most determinative of the level of quality.

Upon generating the level of quality, the search result being evaluated by the classification process 220 may be assigned a score 230 based on the level of quality. This score 230 may then be compared against a threshold value to determine whether the search result is of good quality or of poor quality. In an exemplary embodiment, the assigned score 230 represents a value within an absolute scale (numeric value between 0 and 100) and the threshold value represents a discounted cumulative gain (DCG) threshold value, which is a metric for quantify a quality of a search result within the absolute scale.

Accordingly, the comparison of the score to the threshold value transforms the search-result level of quality from a parameter within a predefined range into an absolute measurement 240. In embodiments, the absolute measurement 240 is a yes-or-no or positive-or-negative answer that precludes presenting an unmanageable range of answers. In other words, the absolute measurement 240 is restricted to one of two alternative results (i.e., either good quality or poor quality). In operation, the absolute value of the absolute measurement 240 instructs the search engine whether to perform one or more corrective actions, while a confidence level, discussed below, is employed by the search engine to select one or more of the corrective actions to perform, upon being triggered by the absolute measurement 240.

Figure 3:
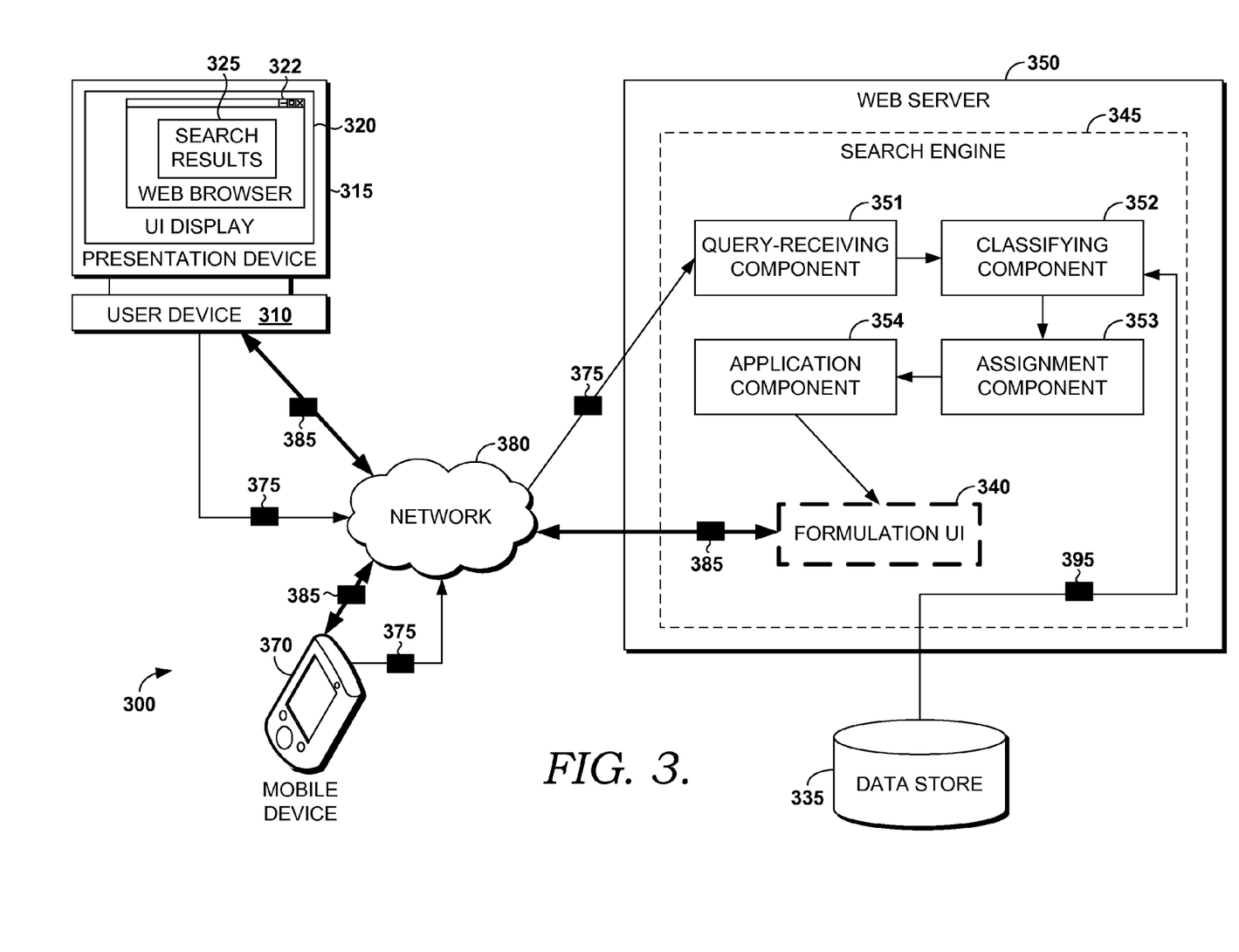
FIG. 3 is a block diagram of an exemplary network environment suitable for use in implementing embodiments of the invention.

The system architecture for implementing the method of making an absolute classification (e.g., absolute measurement 240 of FIG. 2) of a quality of at least one search result and taking one or more corrective actions based upon a value of the absolute classification will now be discussed with reference to FIG. 3. Initially, FIG. 3 is a block diagram illustrating a distributed computing environment 300 suitable for use in implementing embodiments of the present invention. The exemplary computing environment 300 includes a user device 310, a data store 335, a web server 350, a mobile device 370, and a network 380 that interconnects each of these items. Each of the user device 310, the data store 335, the web server 350, and the mobile device 370, shown in FIG. 3, may take the form of various types of computing devices, such as, for example, the computing device 100 described above with reference to FIG. 1. By way of example only and not limitation, the user device 310, the web server 350, and/or the mobile device 370 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, each of the user device 310, the web server 350, and the mobile device 370 includes, or is linked to, some form of a computing unit (e.g., central processing unit, microprocessor, etc.) to support operations of the component(s) running thereon (e.g., query-receiving component 351, classifying component 352, assignment component 353, application component 354, and the like). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the user device 310, the web server 350, and/or the mobile device 370, respectively, in order to enable each device to perform communication-related processes and other operations (e.g., executing the classification process 220 of FIG. 2). In another instance, the computing unit may encompass processor(s) (not shown) coupled to the computer-readable medium accommodated by each of user device 310, the web server 350, and the mobile device 370.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Also, beyond processing instructions, the processor may transfer information to and from other resources that are integral to, or disposed on, the user device 310, the web server 350, and the mobile device 370. Generally, resources refer to software components or hardware mechanisms that enable the user device 310, the web server 350, and the mobile device 370 to perform a particular function. By way of example only, resource(s) accommodated by the web server 350 operate to assist the search engine 345 in receiving inputs from a user at the user device 310 or the mobile device 370 and/or providing an appropriate communication in response to the inputs (e.g., rendering search results 325).

The user device 310 may include an input device (not shown) and a presentation device 315. Generally, the input device is provided to receive input(s) affecting, among other things, search results 325 rendered by a search engine 345 and surfaced at a UI display 320. Illustrative input devices include a mouse, joystick, key pad, microphone, I/O components 120 of FIG. 1, or any other component capable of receiving a user input and communicating an indication of that input to the user device 310. By way of example only, the input device facilitates entry of a search query 375, which is communicated over the network 380 to the web server 350 for processing by the search engine 345.

In embodiments, the presentation device 315 is configured to render and/or present the UI display 320 thereon. The presentation device 315, which is operably coupled to an output of the user device 310, may be configured as any presentation component that is capable of presenting information to a user, such as a digital monitor, electronic display panel, touch-screen, analog set-top box, plasma screen, audio speakers, Braille pad, and the like. In one exemplary embodiment, the presentation device 315 is configured to present rich content, such as the search results 325, associated advertisements, and digital images and videos. In another exemplary embodiment, the presentation device 315 is capable of rendering other forms of media (i.e., audio signals).

The data store 335 is generally configured to store information 395 associated with evaluating a search-result level of quality, determining the score 230, and deriving the absolute measurement 240 based thereon, see FIG. 2. In operation, when the user is implementing a search at the search engine 345, the search engine 345 may access the information 395 residing at the data store 335, such as the user's profile (capturing historic search behavior of the user), a data log of general social behavior (capturing historic online activity of a plurality of users), and/or one or more inputs 250 to the classification process 220, see FIG. 2.

In other embodiments, the data store 335 may be configured to be searchable for suitable access to the information maintained thereby. For instance, the data store 335 may be searchable for inputs 250 to the classification process 220 and for human-judged ratings to train the classification process 220. It will be understood and appreciated by those of ordinary skill in the art that the information stored in the data store 335 may be configurable and may include any information relevant to the determination and/or the retrieval of the a search-result level of quality, as well as the selection of the corrective actions that are triggered therefrom. The content and volume of such user-interaction information are not intended to limit the scope of embodiments of the present invention in any way. Further, though illustrated as single, independent components, the data store 335 may, in fact, be a plurality of databases, for instance, a database cluster, portions of which may reside on the client device 310, the web server 350, the mobile device 370, another external computing device (not shown), and/or any combination thereof.

This distributed computing environment 300 is but one example of a suitable environment that may be implemented to carry out aspects of the present invention and is not intended to suggest any limitation as to the scope of use or functionality of the invention. Neither should the illustrated distributed computing environment 300 be interpreted as having any dependency or requirement relating to any one or combination of the devices 310, 350, and 370, the data store 335, and components 351-354 as illustrated. In some embodiments, one or more of the components 351-354 may be implemented as stand-alone devices. In other embodiments, one or more of the components 351-354 may be integrated directly into the web server 350, or on distributed nodes that interconnect to form the web server 350. It will be appreciated and understood that the components 351-354 (illustrated in FIG. 3) are exemplary in nature and in number and should not be construed as limiting.

Accordingly, any number of components may be employed to achieve the desired functionality within the scope of embodiments of the present invention. Although the various components of FIG. 3 are shown with lines for the sake of clarity, in reality, delineating various components is not so clear, and, metaphorically, the lines would more accurately be grey or fuzzy. Further, although some components of FIG. 3 are depicted as single blocks, the depictions are exemplary in nature and in number and are not to be construed as limiting (e.g., although only one presentation device 315 is shown, many more may be communicatively coupled to the client device 310).

Further, the devices of the exemplary system architecture may be interconnected by any method known in the relevant field. For instance, the user device 310, the web server 350, and the mobile device 370 may be operably coupled via a distributed computing environment that includes multiple computing devices coupled with one another via one or more networks (not shown). In embodiments, the network may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the components 351-354 are designed to perform a process that includes, at least, automatically determining an absolute measurement (good quality or poor quality) of the search results, individually, and taking a corrective action if appropriate. It should be noted that the operation of the search engine 345 will be discussed with reference to FIGS. 3 and 4 in concert.

Initially, the search engine 345 includes the query-receiving component 351 configured to receive the search query 375 issued by a user and to return the set of search results 325 that are generated, in part, based upon the search query 375. In this way, the query-receiving component 351 acts as a frontend experience 420 of FIG. 4, which interfaces with a user 410, while a top level aggregator 440 provides the backend experience. In embodiments, the backend experience involves the top level aggregator 440 issuing a processed query 411 to a web index 450 and retrieving the search results 325 therefrom.

Figure 4:
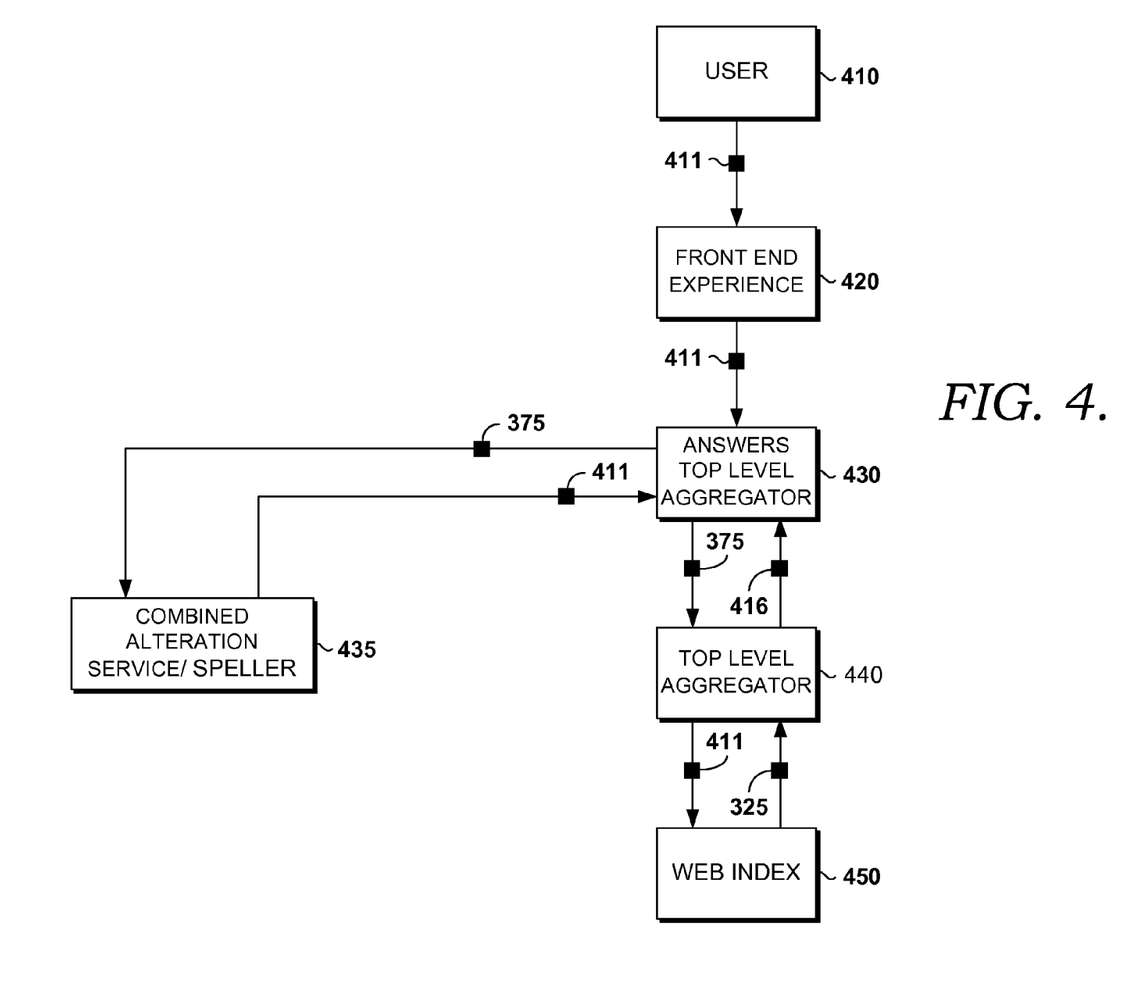
FIG. 4 is a block diagram of an exemplary process flow between entities cooperatively conducting an online search, in accordance with embodiments of the invention.

With continued reference to FIG. 4, the answers top level aggregator 430 is configured to process the search query 375 by sending the search query 375 to the combined alteration service/speller 435. Upon the answers top level aggregator 430 receiving the processed query 411 (e.g., having misspellings corrected and other synonyms/logical alterations attached), the processed query 411 is used to generate the search results 325. Upon receiving the search results 325, the top level aggregator 440 performs the classification process 220 of FIG. 2 to generate an output 416 (e.g., absolute measurement 240 of FIG. 2) that is passed back to the answers top level aggregator 430.

Turning now to the system architecture within the computing environment 300 of FIG. 3, the classifying component 352 is provisioned similar to or hosted by the top level aggregator 440 of FIG. 4. That is, the classifying component 352 is configured to carry out the classification process that automatically determines a quality measurement of one or more search results of the set of search results 325. As described in detail above with reference to FIG. 2, the classification process is employed to automatically determine whether the search results 325 are acceptable (i.e., satisfy the user intent of the search query 375) in an absolute sense. Typically, the classification process includes the steps of evaluating various features exhibited by the search result(s) 325 to determine an overall level of quality and deriving the absolute measurement from the overall level of quality determined for each of the search result(s) 325. Generally, the absolute measurement identifies the search result(s) 325, respectively, as either of good quality or of poor quality in a mutually exclusive manner.

In an exemplary embodiment, the assigning component 353 is configured to label each of the search result(s) 325 as either "good quality" or "poor quality" based on an outcome of the classification process. These labeled search results are passed to the application component 354, that invokes an appropriate corrective action when one or more of the search results (e.g., the X-number of highest ranked search results or a majority of the search results on the SERP) are labeled as "poor quality."

In an exemplary embodiment, the appropriate corrective action is selected as a function of a level of confidence. As used herein, the "level of confidence" is not meant to be limiting in definition, but encompasses any metric that relates to a likelihood that any alternative terms within a rewritten search query, offered by the application component 354, will produce new search results that are improved over the current "poor quality" search results 325. Concisely, in embodiments, the level of confidence indicates a probability that a search-engine composed search query will produce enhanced search results. In application, the level of confidence is used to select one or more corrective actions, such as rendering a reformulation user interface (UI) 340, alerting a user that the search result(s) 325 are labeled "poor quality" via a notification message, abstaining from presenting to the user the poor-quality search results, or automatically rewriting the search query 375 to generate an updated set of search results.

In an exemplary embodiment, the search query 375 is automatically rewritten and automatically issued upon calculating a high level of confidence in the alternative terms suggested by the application component 354. In contrast, the reformulation UI 340 is rendered upon calculating a low level of confidence in the alternative terms suggested by the application component 354. In one instance, the reformation UI 340 solicits and accepts user-initiated interactions 385, such as mouse-click selections, for guiding the alteration of key terms within the search query. By way of example, altering key terms may involve replacing or removing one or more key terms within the search query 375.

Although various different methods enhancing the search results 325 upon determining that one or more search results are labeled "poor quality" have been described, it should be understood and appreciated that other types of suitable methods and interfaces for selecting and implementing corrective actions may be used, and that embodiments of the present invention are not limited to those corrective actions discussed above. For instance, an additional corrective action may involve presenting a third-party entity the opportunity to reformulate the search query 375 using the third-party entity's experience and resources.

Figure 5:
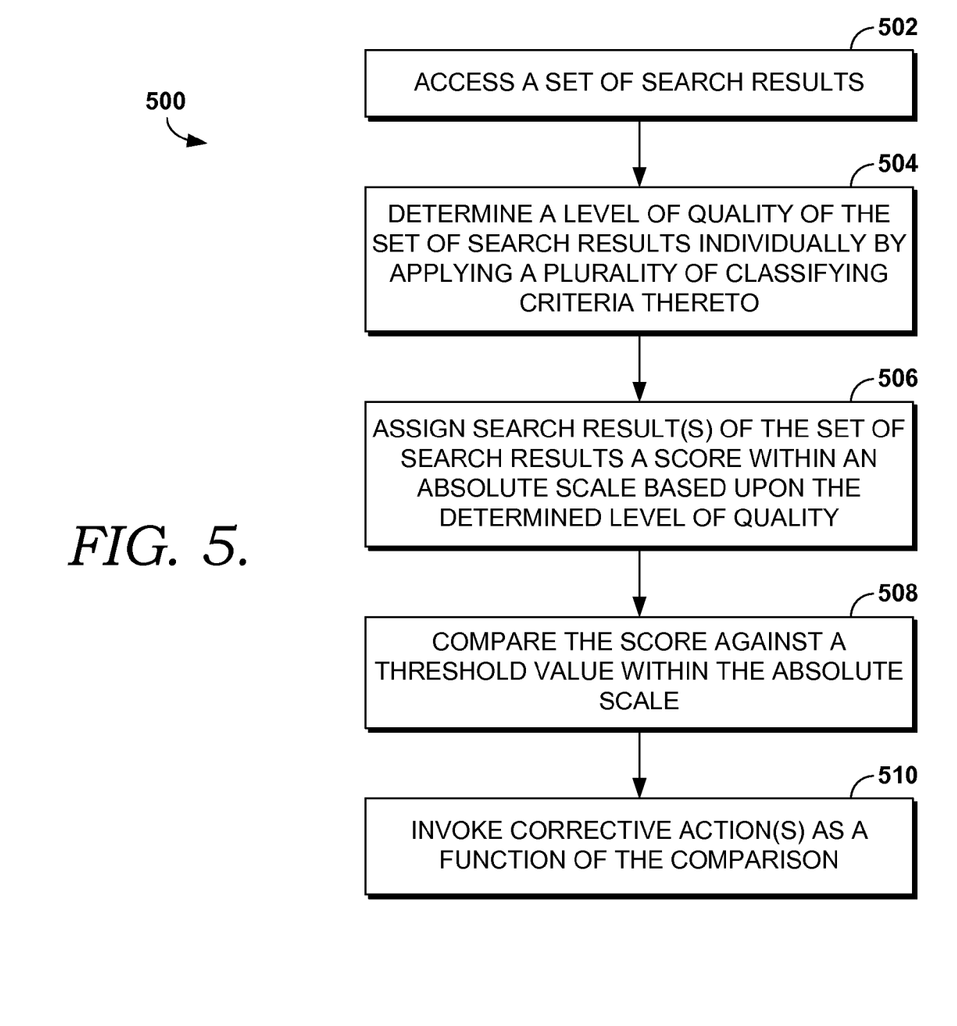
FIG. 5 is a flow diagram showing an overall method for employing a level of quality of a set of search results to invoke one or more corrective actions, in accordance with embodiments of the invention.

Turning now to FIG. 5, a flow diagram is shown depicting an illustrative method 500 for employing a level of quality of a set of search results to invoke one or more corrective actions, in accordance with embodiments of the invention. Initially, it should be appreciated and understood that although the terms "step" and/or "block" may be used herein to connote different elements of methods employed, the terms should not be interpreted as implying any particular order among or between various steps herein disclosed unless and except when the order of individual steps is explicitly described.

In an exemplary embodiment, the method 500 involves accessing the set of search results (see block 502) and determining the level of quality of the set of search results individually by applying a plurality of classifying criteria thereto (see block 504). As more fully discussed above, the classifying criteria include evaluating at least one of ranking features, quality-level features, caption-level features, session-level features, or aggregate features that are expressed by the search results individually. The method may continue by assigning at least one search result of the set of search results a score within an absolute scale, as indicated at block 506. Typically, the score is based upon the determined level of quality. As indicated at block 508, the score may be compared against a threshold value within the absolute scale. As a result, one or more corrective actions may be selected and performed based on an outcome of the comparison. This is indicated at block 510.

Figure 6:
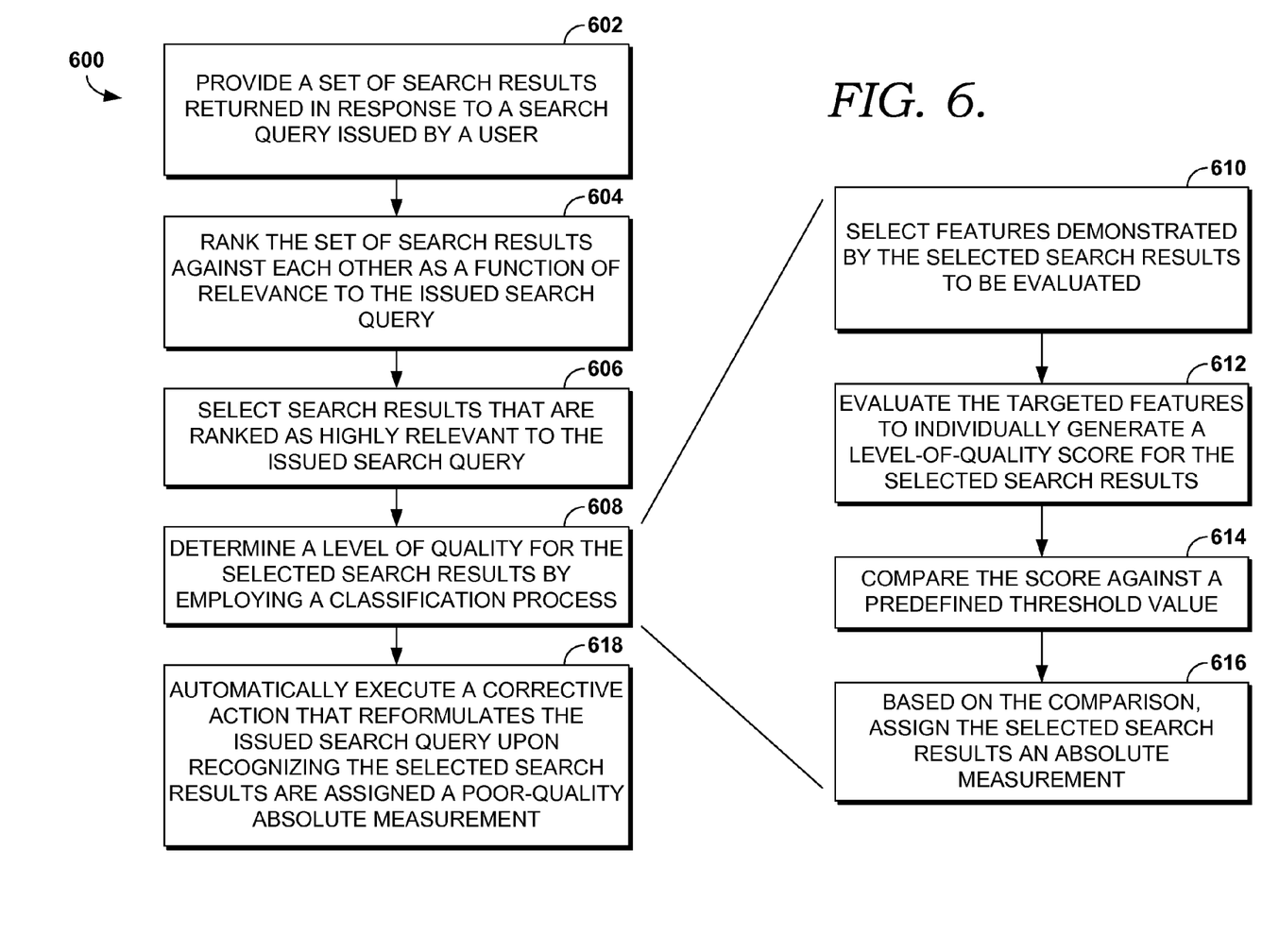
FIG. 6 is a flow diagram showing an overall method of classifying search results as either of good quality or of poor quality, in accordance with embodiments of the invention.

Referring to FIG. 6, a flow diagram is shown depicting illustrative method 600 of classifying search results as either of good quality or of poor quality, in accordance with embodiments of the invention. Initially, the method 600 may represent a computerized method carried out by a search engine (running on a processor) for classifying search results as either of good quality or of poor quality is provided. In embodiments, the method 600 may involve the step of providing a set of search results returned in response to a search query composed and issued by a user, as indicated at block 602. As indicated at block 604, the set of search results may be ranked against each other. In one instance, the ranking is computed as a function of relevance of each search result to the issued search query. The search engine may then select for evaluation one or more search results that are ranked as highly relevant to the issued search query, as indicated at block 606.

A level of quality for each of the selected search results may be determined by employing a classification process, as indicated at block 608. In an exemplary embodiment, the classification process includes one or more of the following steps: targeting features demonstrated by the selected search results to be evaluated (see block 610); evaluating the targeted features to individually generate a level-of-quality score for each of the selected search results (see block 612); comparing the score against a predefined threshold value (see block 614); and, based on the comparison, assigning each of the selected search results an absolute measurement (see block 616). In instances, the absolute measurement indicates good quality when the score is greater than the threshold value. Otherwise, the absolute measurement indicates the selected search results are of poor quality. Upon recognizing that the selected search results are assigned an absolute measurement that indicates poor quality, automatically executing a corrective action that reformulates the issued search query upon recognizing, as indicated at block 618.

As discussed above, the corrective action may involve the search engine implicitly rewriting the search query (e.g., when a confidence in the automatically composed search query is high). Or, the corrective action may involve explicitly providing a user preset suggestions, within a reformulation UI, that solicit the user's feedback for altering key terms of the search query (e.g., when a confidence in the automatically composed search query is low). In will be appreciated and understood that other corrective actions may be implemented that assist a user in efficiently arriving upon search results relevant to his or her user intent.

Various embodiments of the invention have been described to be illustrative rather than restrictive. Alternative embodiments will become apparent from time to time without departing from the scope of embodiments of the inventions. It will be understood that certain features and sub-combinations are of utility and may be employed without reference to other features and sub-combinations. This is contemplated by and is within the scope of the claims.

The invention claimed is:

1. One or more computer-readable storage media excluding signals per se having embodied thereon computer-executable instructions that, when executed, perform a method comprising:
    providing a set of search results returned in response to a search query composed and issued by a user;
    determining a ranking of the set of returned search results against each other as a function of relevance to the issued search query;
    selecting for evaluation one or more search results from the returned set of search results based on the ranking;
    determining a level of quality, that is independent of the terms of the search query, for each of the one or more selected search results from the returned set of search results by employing a classification process, wherein the classification process comprises:
    targeting features demonstrated by the one or more selected search results to be evaluated;
    evaluating the targeted features to generate a level-of-quality score for each of the one or more selected search results, wherein the level-of-quality score is evaluated using a cross-result entropy that quantifies a level of similarity between a plurality of the search results, and wherein the search engine is configured to decrease the level-of-quality score based on determining that the cross-result entropy is sufficiently high;
    comparing the level-of-quality score against a predefined threshold value; and
    based on the comparison, assigning each of the one or more selected search results an absolute measurement, wherein the absolute measurement indicates good quality when the level-of-quality score is greater than the threshold value, and wherein the absolute measurement indicates poor quality when the level-of-quality score is less than the threshold value;
    calculating a level of confidence that a rewritten search query will provide new search results that improve the set of search results;
    automatically rewriting the search query by the search engine to generate the rewritten search query, wherein each key word of the rewritten search query is automatically selected for inclusion in the rewritten search query; and
    based on the calculated level of confidence indicating that the rewritten search query will provide the new search results that improve the set of search results, and based on identifying that the absolute measurement assigned to at least one of the one or more selected search results indicates the poor quality, automatically conducting a search with the rewritten search query.

2. The media of claim 1, wherein the set of search results are generated based upon at least one term within the search query.

3. The media of claim 1, wherein the ranking of the set of search results against one another is based on, in part, relevance to a user intent implicit within the search query, the selecting for evaluation the one or more search results targets a high-ranked search result within the ranking for initiating the determination of the level of quality.

4. The media of claim 1, wherein the targeted features further comprise one or more quality-level features that individually quantify an overall quality of the plurality of the search results independent of the search query, wherein the overall quality is a function of at least one of contents of the plurality of the search results or domain names integral to the plurality of the search results.

5. The media of claim 1, wherein the targeted features further comprise one or more session-level features that label search results within the set of search results as either relevant or irrelevant based upon user-initiated refinements to the search results during a course of an online session.

6. The media of claim 1, wherein the the level of similarity is based on variation between contents of the plurality of the search results.

7. The media of claim 1, comprising alerting the user that at least one of the one or more selected search results are of the poor quality by presenting a notification message on a search-results page.

8. The media of claim 1, comprising abstaining from presenting the at least one of the one or more selected search results based upon the absolute measurement assigned to the at least one of the one or more selected search results indicating the poor quality.

9. A computerized method carried out by a search engine running on a processor for classifying search results as either of good quality or of poor quality, the method comprising:
providing a set of search results returned in response to a search query composed and issued by a user;
determining a ranking of the set of returned search results against each other as a function of relevance to the issued search query;
selecting for evaluation one or more search results from the returned set of search results based on the ranking;
determining a level of quality, that is independent of the terms of the search query, for each of the one or more selected search results from the returned set of search results by employing a classification process, wherein the classification process comprises:
targeting features demonstrated by the one or more selected search results to be evaluated;
evaluating the targeted features to generate a level-of-quality score for each of the one or more selected search results, wherein the level-of-quality score is evaluated using a cross-result entropy that quantifies a level of similarity between a plurality of the search results, and wherein the search engine is configured to decrease the level-of-quality score based on determining that the cross-result entropy is sufficiently high;
comparing the level-of-quality score against a predefined threshold value; and
based on the comparison, assigning each of the one or more selected search results an absolute measurement, wherein the absolute measurement indicates good quality when the level-of-quality score is greater than the threshold value, and wherein the absolute measurement indicates poor quality when the level-of-quality score is less than the threshold value;
calculating a level of confidence that a rewritten search query will provide new search results that improve the set of search results;
automatically rewriting the search query by the search engine to generate the rewritten search query, wherein each key word of the rewritten search query is automatically selected for inclusion in the rewritten search query; and
based on the calculated level of confidence indicating that the rewritten search query will provide the new search results that improve the set of search results, and based on identifying that the absolute measurement assigned to at least one of the one or more selected search results indicates the poor quality, automatically conducting a search with the rewritten search query.

10. A system comprising one or more processors that performs a method comprising:
providing a set of search results returned in response to a search query composed and issued by a user;
determining a ranking of the set of returned search results against each other as a function of relevance to the issued search query;
selecting for evaluation one or more search results from the returned set of search results based on the ranking;
determining a level of quality, that is independent of the terms of the search query, for each of the one or more selected search results from the returned set of search results by employing a classification process, wherein the classification process comprises:
targeting features demonstrated by the one or more selected search results to be evaluated;
evaluating the targeted features to generate a level-of-quality score for each of the one or more selected search results, wherein the level-of-quality score is evaluated using a cross-result entropy that quantifies a level of similarity between a plurality of the search results, and wherein the search engine is configured to decrease the level-of-quality score based on determining that the cross-result entropy is sufficiently high;
comparing the level-of-quality score against a predefined threshold value; and
based on the comparison, assigning each of the one or more selected search results an absolute measurement, wherein the absolute measurement indicates good quality when the level-of-quality score is greater than the threshold value, and wherein the absolute measurement indicates poor quality when the level-of-quality score is less than the threshold value;
calculating a level of confidence that a rewritten search query will provide new search results that improve the set of search results;
automatically rewriting the search query by the search engine to generate the rewritten search query, wherein each key word of the rewritten search query is automatically selected for inclusion in the rewritten search query; and
based on the calculated level of confidence indicating that the rewritten search query will provide the new search results that improve the set of search results, and based on identifying that the absolute measurement assigned to at least one of the one or more selected search results indicates the poor quality, automatically conducting a search with the rewritten search query.

11. The system of claim 10, wherein the automatically conducting the search with the rewritten search query is selected as a first corrective action over rendering a reformulation user interface (UI) for the search query based on determining that the calculated level of confidence is sufficiently high.

12. The system of claim 11, wherein the reformulation UI is configured to receive user feedback that comprises user-initiated selections that trigger replacement or removal of one or more key terms within the search query.

13. The system of claim 10, wherein the method comprises assigning a classification to the or more selected search results in an absolute sense, such that the classification is either the good quality or the poor quality.

14. The system of claim 10, wherein the automatically conducting the search with the rewritten search query is performed based on determining that the absolute measurement assigned to at least a predetermined number of results in the set of search results indicates the poor quality.

15. The system of claim 10, wherein the the tracked features comprise at least one caption-level feature that enumerates a number of matches between key terms within the search query and a search-engine prepared summary for one or more of the search results.

16. The system of claim 10, wherein the rewritten search query comprises a plurality of alternative key terms automatically selected for inclusion in the rewritten search query.

17. The system of claim 10, wherein the ranking of the set of search results against one another is based on, in part, relevance to a user intent implicit within the search query, the selecting for evaluation the one or more search results targets a high-ranked search result within the ranking for initiating the determination of the level of quality.

18. The system of claim 10, wherein the level of similarity is based on variation between contents of the plurality of the search results.

19. The system of claim 10, the method comprising abstaining from presenting the at least one of the one or more selected search results based upon the absolute measurement assigned to the at least one of the one or more selected search results indicating the poor quality.

20. The system of claim 10, comprising alerting the user that at least one of the one or more selected search results are of the poor quality by presenting a notification message on a search-results page.

* * * * *